United States Patent [19]

Lee

[11] Patent Number: 6,050,404
[45] Date of Patent: Apr. 18, 2000

[54] MULTIFUNCTIONAL STORAGE CASE

[76] Inventor: Hsiu-Hui Lee, 3 FL., E Area, Room 40, No.5, Sec. 5, Shin-Yi Rd., Taipei, Taiwan

[21] Appl. No.: 09/365,764

[22] Filed: Aug. 3, 1999

[51] Int. Cl.⁷ .................................................. B65D 85/57
[52] U.S. Cl. ....................... 206/308.1; 206/311; 220/326; 402/70
[58] Field of Search ................................ 206/307, 308.1, 206/311, 312, 425; 220/324, 326; 281/29; 402/70, 73–77

[56] References Cited

U.S. PATENT DOCUMENTS

| | | | |
|---|---|---|---|
| 533,053 | 1/1895 | Cooke, Jr. | 206/425 |
| 1,577,697 | 3/1926 | Douglas | 402/70 |
| 2,201,547 | 5/1940 | Scheinman | 206/425 |
| 4,744,689 | 5/1988 | Sternberg | 402/73 |
| 5,193,681 | 3/1993 | Lievsay | 206/425 |
| 5,209,593 | 5/1993 | Ros | 402/77 |
| 5,697,498 | 12/1997 | Weisburn et al. | 206/308.1 |
| 5,701,997 | 12/1997 | O'Brien et al. | 206/308.1 |

*Primary Examiner*—Jim Foster
*Attorney, Agent, or Firm*—Bacon & Thomas, PLLC

[57] ABSTRACT

A multifunctional storage case comprising a case with a hollow accommodation in the center thereof at whose side has side opening which is provided with a elongating side edge at two sides thereof, wherein the inner side of the elongating side edge is respectively fitted with a number of protruding warped members which are vertically paralleled, and wherein a side fastening cover is pivoted at the bottom end of side opening while a binding element for loose-leaves is fixed inside of the side fastening cover for holding thin loose-leaf envelopes to accommodate CDs, other articles, and wherein two sides of the side fastening cover is provided with corresponding resilient fasteners in the middle section thereof is fitted with outwards protruding warped members which are engaged in the middle hollow member between protruding warped members, and wherein a cover is pivoted at the top side of the casing and an arch hook is disposed at the moving side of the cover for being hooked at the outer edge after the opening is covered with the side fastening cover so that a easy storage and a secure positioning are achieved.

4 Claims, 6 Drawing Sheets

MULTIFUNCTIONAL STORAGE CASE

BACKGROUND OF THE INVENTION

1. Field of the Invention

The present invention relates to a multifunctional storage case, and more particularly a case with easy structure and complete protection, and for convenient carrying and practical use.

2. Description of the Prior Art

The conventional storage pack for thin flat objects (e.g. CDs etc), as shown in FIG. 1, is made of a soft plastic material to be a foldable, extendable cover 5 which is stuck with a number of thin flat loose-leaf envelopes 51 in the center thereof for accommodating CDs or other thin flat articles. Two ends of the cover 5 are fitted with Velcro fasteners 52, 53 for fixing the cover 5 in position and packing the loose-leaf envelopes 51 together, so that the cover 5 can completely cover the loose-leaf envelopes 51. Accordingly, the storage and protection effect for the basic thin flat articles are achieved. Thereafter, another conventional one discloses a structure with a zipper disposed at the edge thereof to close the opening (not shown). Except that the above-mentioned Velcro fasteners 52, 53 are replaced with zipper, the other structure is almost identical. Although this kind of design is featured by low cost and practical use, the cover 5 is made of soft materials and it has only a simple storing effect without pressure-resistant strength, so that this kind of design can't protect the inside from pressure and shock.

Another storage case for thin flat articles with a hard form, as shown in FIG. 2, includes a cover 61 pivoted on the casing 6 with an opening to cover the opening of the casing while a number of loose-leaf envelopes 62 are stuck to one side inside of the casing 6 for accommodating articles like CDs. This kind of design has a stronger structure and a better protection effect. However, the loose-leaf envelopes are overlapped on one side inside of the casing, so that the thin flat articles situated on the lower layer are not easily removed, even causing damage to the CD's surface in process of removal.

Still another one is designed with a storage box with a number of storage cases to accommodate thin flat objects, wherein each storage case is fitted with a drive mechanism by which the storage case can slide in a pre-arranged slide rail on the box. Objects like CD can be stored in the storage cases for thin flat objects. However, this kind of design has a complex structure, a large volume, a higher cost, easily causes malfunctions and is uneasy to carry. Therefore, it's unfavorable for promotion in the market.

SUMMARY OF THE INVENTION

It is a main object of the present invention to provide a multifunctional storage case with a casing having a side opening at one side of the casing, wherein a side fastening cover is pivoted to the bottom of the side opening, and a binding element for loose-leaves is fixed inside of the side fastening cover for holding the loose-leaf envelopes to accommodate thin flat objects like CDs or small decorations, and wherein the side fastening cover can be turned outwards so that the loose-leaf envelopes on the binding element can extend outwards for easy removal and convenient use and to achieve a complete, effectively pressure-resistant, shock-resistant effect.

It is another object of the present invention to provide a multifunctional storage case, wherein the inner side of two extending side edges of the side opening of the casing is provided with several front and rear protruding warped members which are vertically paralleled, and wherein two sides of the side fastening cover is provided with corresponding resilient fasteners in the middle section thereof which is fitted with outwards protruding warped members engaged in the middle hollow member between protruding warped members, and wherein a cover is pivoted at the top side of the casing and an arch hook is disposed at the moving side of the cover for being hooked at the outer edge after the opening is covered with the side fastening cover so that a easy storage and a secure positioning is achieved.

It is a further object of the present invention to provide a multifunctional storage case with the binding element for loose-leaves mounted on the side fastening cover so that the amount of the loose-leaf envelopes to accommodate CDs can be variable and a flexible capacity can be achieved for application in all kinds of places.

BRIEF DESCRIPTION OF THE DRAWINGS

The drawings disclose illustrative an embodiment of the present invention which serves to exemplify the various advantages and objects hereof, and are as follows.

DETAILED DESCRIPTION OF THE PREFERRED EMBODIMENT

Figure 1:
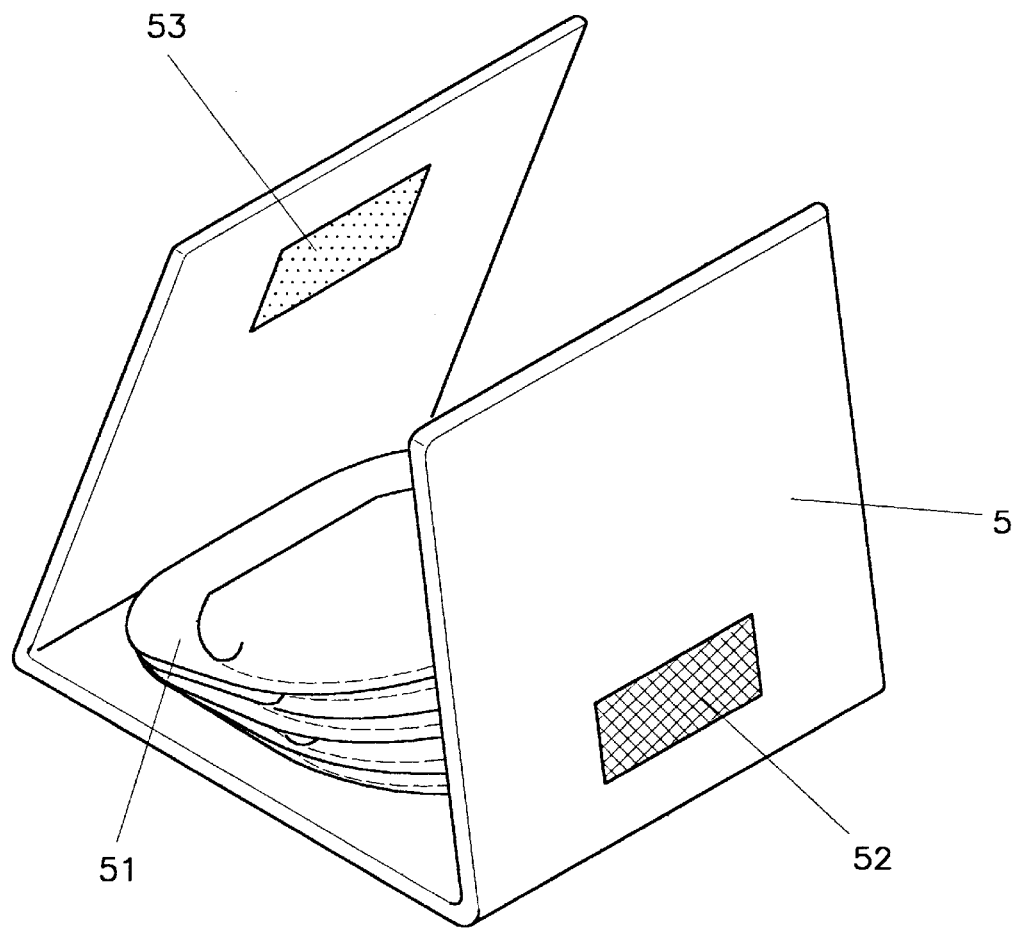
FIG. 1 is a perspective view of a conventional CD storage pack.
Figure 2:
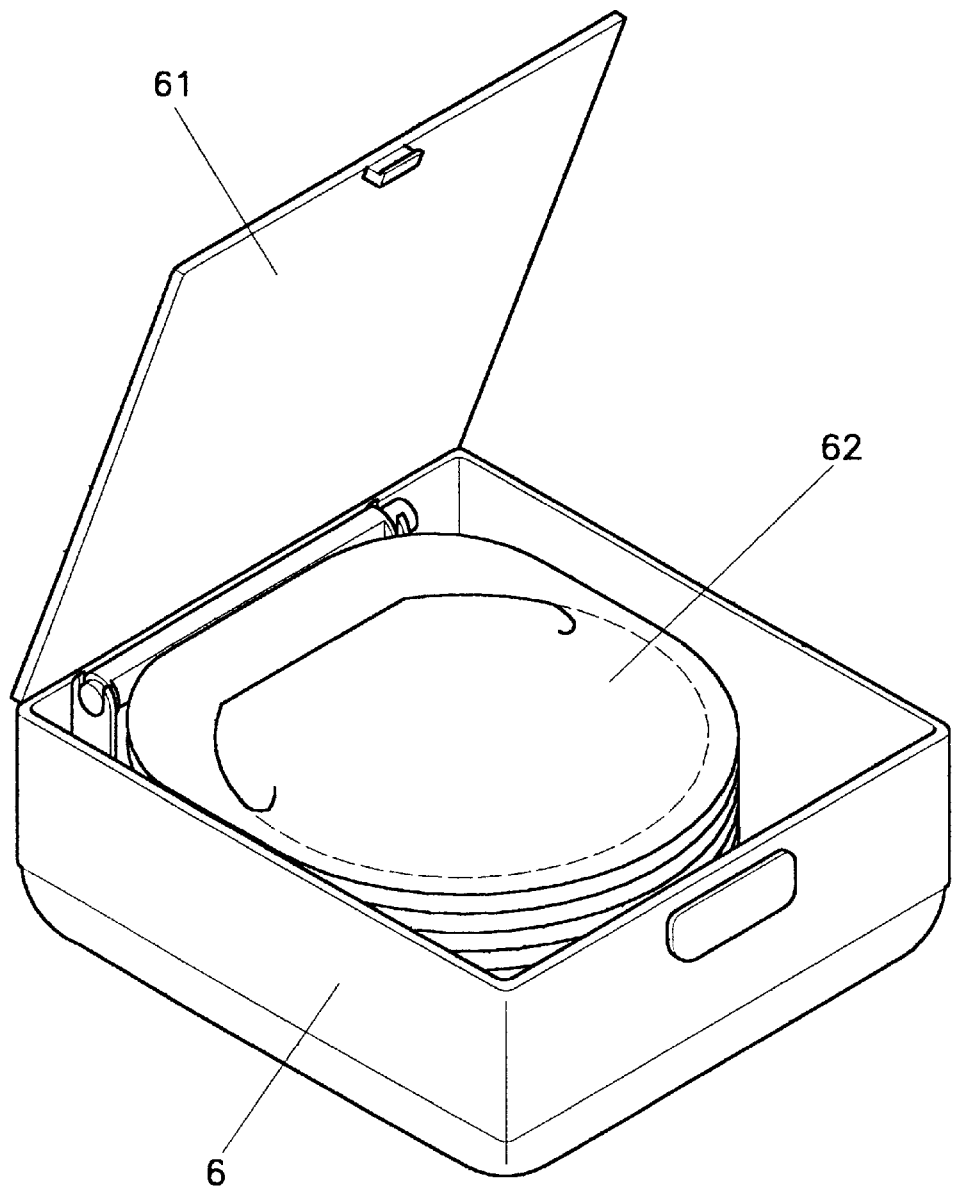
FIG. 2 is a perspective view of a conventional CD storage box with hard casing for CDs.

As shown in FIGS. 1 and 2, the configurations and the disadvantages of the conventional storage pack or box have been described above and won't repeat hereafter.

Figure 3:
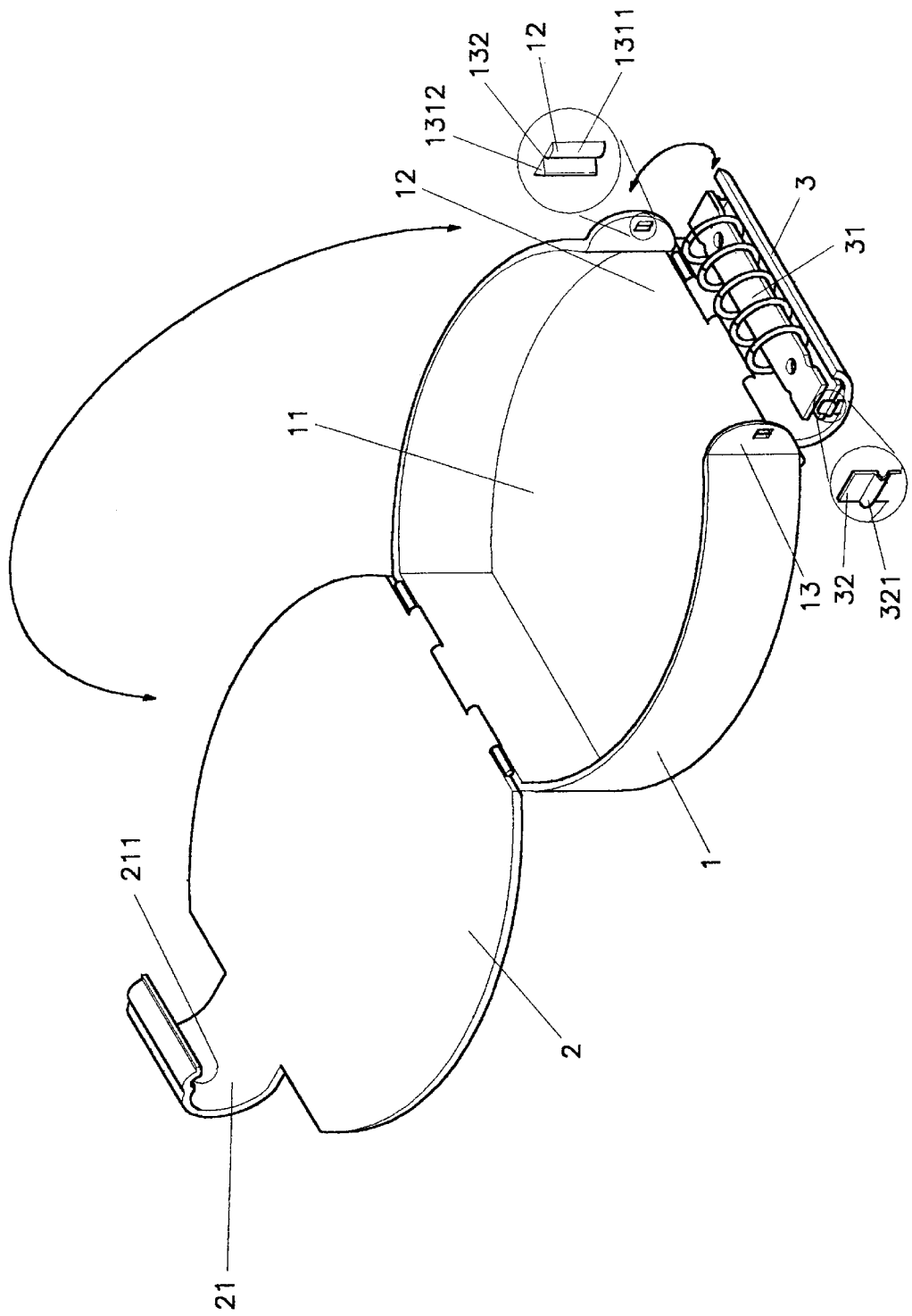
FIG. 3 is a first developed view of the present invention.
Figure 4:
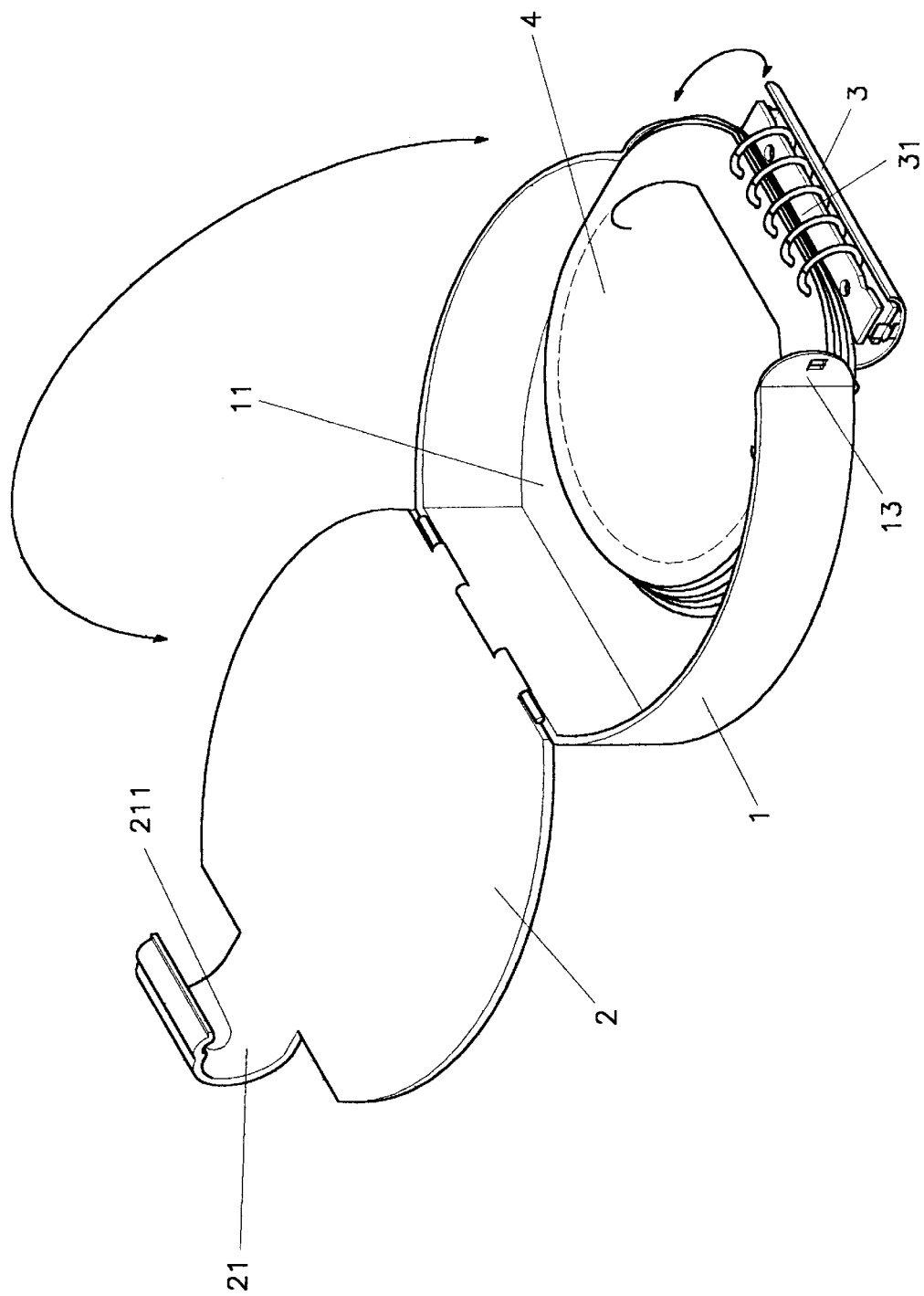
FIG. 4 is a second developed view of the present invention.
Figure 5A:
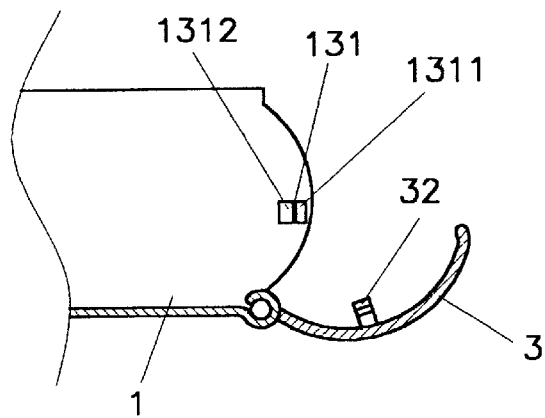
FIG. 5A is a first schematic drawing of the side fastening cover in accordance with the present invention, illustrating the assembly movement.
Figure 5B:
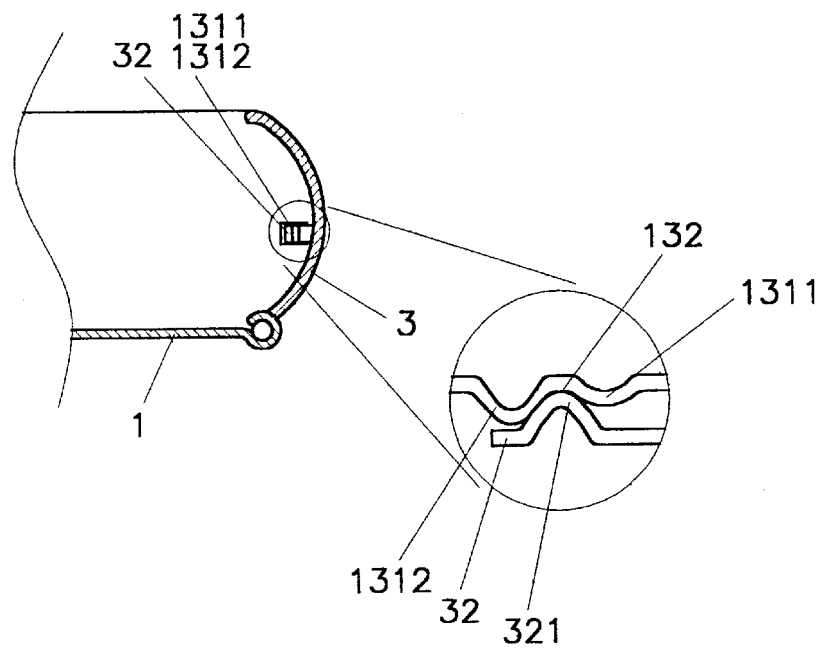
FIG. 5B is a second schematic drawing of the side fastening cover in accordance with the present invention, illustrating the assembly movement.
Figure 6A:
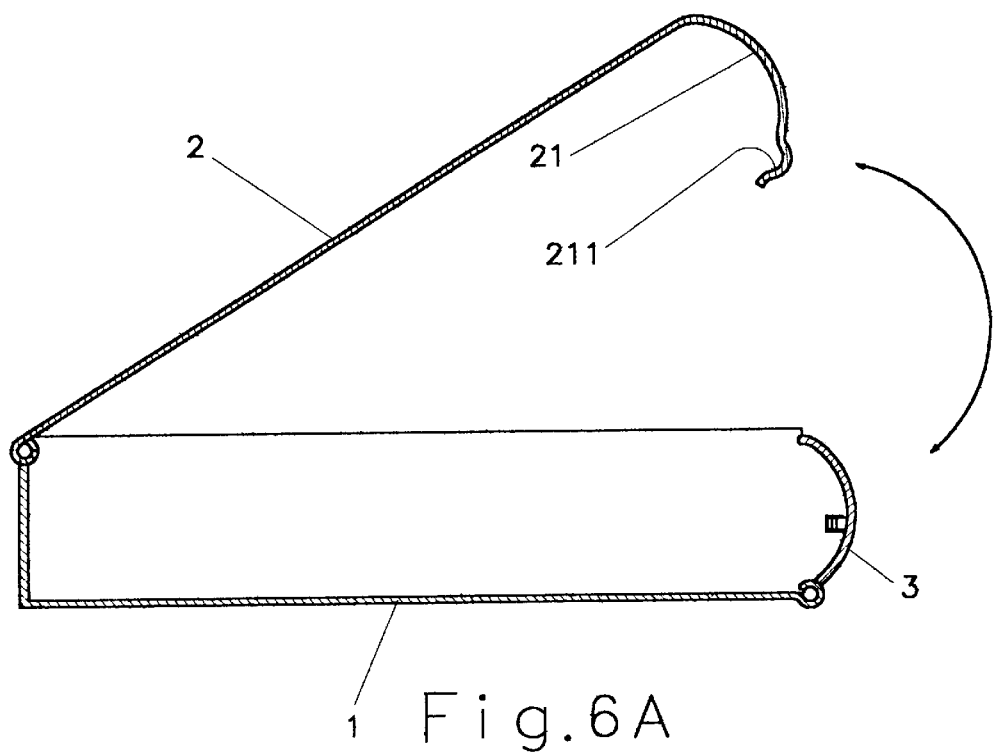
FIG. 6A is a first schematic drawing of the cover in accordance with the present invention, illustrating the assembly movement.
Figure 6B:
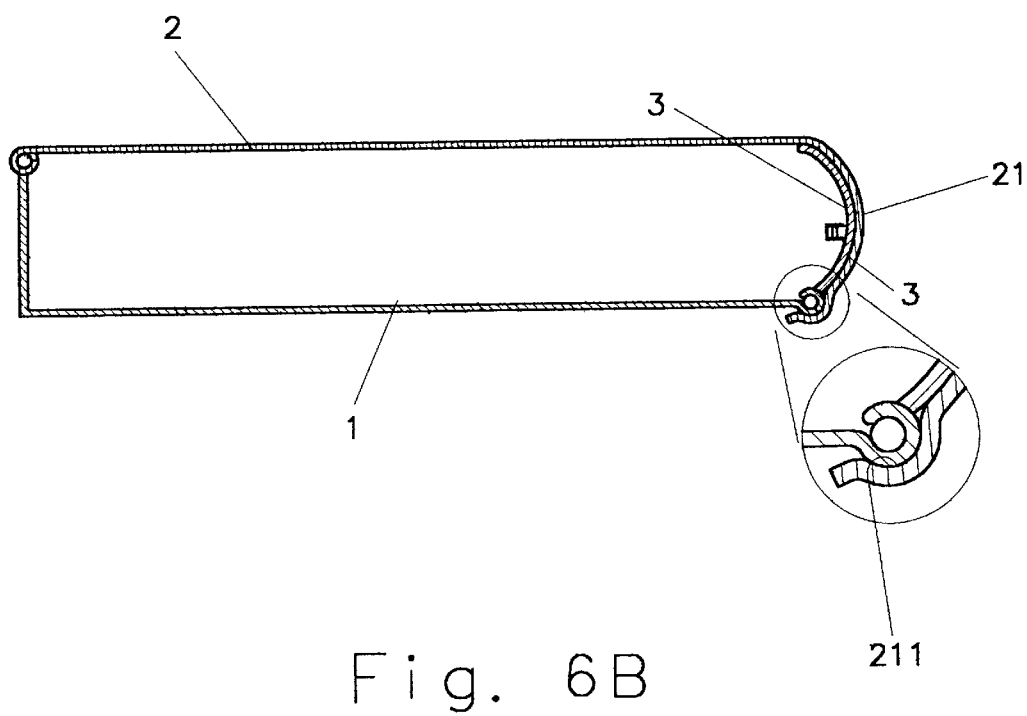
FIG. 6B is a second schematic drawing of the cover in accordance with the present invention, illustrating the assembly movement.

FIGS. 3 and 4 show developed views of the present invention. As shown in FIG. 4, the present invention includes a casing 1, a cover 2 and a side fastening cover 3, wherein the middle of the casing 1 has a hollow accommodation 11 at whose side a side opening 12 is disposed which is respectively provided with an outwards elongating side edge 13 at two side thereof which has several front and rear protruding warped members 1311, 1312 which are vertically arranged and paralleled to each other and between which a middle hollow member 132 is provided, and wherein the front protruding warped members 1311 is lower than the rear one 1312. The cover 2 is pivoted at the side of the casing 1 in such a way to cover the top opening of the hollow accommodation 11, wherein an arch hook 21 is mounted at the middle section of the moving side of the cover 2 and an engaging groove 211 is fitted to the elongating end thereof.

The side fastening cover 3 is pivoted to the bottom edge of the side opening 12 of the casing 1 and the section thereof has the same warped camber as that of the edge of the elongating edge 13, wherein a binding element 31 for holding a number of loose-leaf envelopes is riveted at the inner edge of the side fastening cover 3, and wherein the loose-leaf envelopes 4 can store CDs or other individual decorations or articles. The two ends of the side fastening cover 3 are respectively provided with a vertically elongating, resilient fastener 32 on which an outwards protruding warped member 321 is mounted.

FIGS. 5A through 6B are the schematic drawings for illustrating the assembly of the members. In assembling, the loose-leaf envelopes 4 on the binding element 31 are turned into the hollow accommodation 11 of the casing 1. Thereafter, the side fastening cover 3 is turned to fix on the outer side of the side opening 12. At this time, the resilient fasteners 32 of the side fastening cover 3 slide through the front and rear protruding warped members 1311, 1312 of the elongating side edge 13. The height of the rear protruding warped members 1312 is higher than that of the front protruding warped members 1311 in order to prevent from the over-engaging of the protruding warped member causing separation from the engaging effect. The protruding warped member is engaged in the middle hollow member 132 in position so that the side fastening cover 3 can be firmly connected to the side opening 12. Thereafter, the cover 2 can be attached to the top of the hollow accommodation 11 of the casing 1 by means that the arch hook 21 is hooked at the outer side of the side fastening cover 3 while the engaging groove 211 is engaged on the pivoted shaft of the side fastening cover 3 and the casing 1. Accordingly, the cover 2 can be more firmly connected with the casing 1 and the side fastening cover 3.

With the configuration in accordance with the present invention, the side fastening cover 3 can be randomly pivoted turned, and turned outwards to the side of the side opening 12. Besides, the loose-leaf envelopes 4 on the binding element 31 can be easily turned to search CD, other articles etc. More loose-leaf envelopes 4 can be attached to the openable binding element 31 so as to meet different using requirements and to have different accommodation capacity.

From the above-mentioned, the multifunctional storage case in accordance with the present invention provides an excellent storage, a convenient search and an easy use for thin articles, e.g. CD.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A multifunctional storage case at least comprising:

a casing (1) having a hollow accommodation in the middle thereof, wherein said hollow accommodation is fitted with a side opening at the side thereof which is respectively provided with an outwards elongating side edge at two side thereof which has several front and rear protruding warped members which are vertically arranged and paralleled to each other and between which a middle hollow member is provided;

a side fastening cover pivoted at the bottom end of the said opening of said casing and being able to cover said side opening, wherein a binding element for loose-leaves is fixed at the inner edge of said side fastening cover to hold loose-leaf envelopes for storing CDs, and wherein the two ends of said side fastening cover are respectively provided with a vertically elongating, resilient fastener on which an outwards protruding warped member is mounted in such a way that said protruding warped member is engaged in said middle hollow member in position when said side opening is covered with said side fastening cover; and a cover pivoted at the side of said casing in such a way to cover the opening at the top of said hollow accommodation, wherein the middle section of the moving side of said cover is provided with an arch hook which can be hooked at the outer edge of said side fastening cover after said side opening is covered, so that the whole body is more firmly secured.

2. The multifunctional storage case as claimed in claim 1, wherein the inner side of two extending side edges of said side opening of said casing is provided with several front and rear protruding warped members which are vertically paralleled, and wherein the height of said front protruding warped members is lower than that of said rear protruding warped members in order to prevent said protruding warped member of said resilient fastener from being over-engaged and being separate from engaging.

3. The multifunctional storage case as claimed in claim 1, wherein the extending end of said arch hook of said cover is fitted with an engaging groove which can be, after connection, engaged on a pivoted shaft between said side fastening cover and said cover so as to create a firmer hooking effect.

4. The multifunctional storage case as claimed in claim 1, wherein the section of said side fastening cover is sectionally created in the same warped arch shape as the edge of said elongating side edge of said casing so as to achieve a firmer connection after connection of both members.

* * * * *